US012687240B1

(12) United States Patent
Owens

(10) Patent No.: US 12,687,240 B1
(45) Date of Patent: Jul. 21, 2026

(54) VALVE HANDLE

(71) Applicant: Green Leaf, Inc., Fontanet, IN (US)

(72) Inventor: Curt Owens, Fontanet, IN (US)

(73) Assignee: GREEN LEAF, INC., Fontanet, IN (US)

( * ) Notice: Subject to any disclaimer, the term of this patent is extended or adjusted under 35 U.S.C. 154(b) by 0 days.

(21) Appl. No.: 19/634,329

(22) Filed: Mar. 31, 2026

Related U.S. Application Data

(63) Continuation of application No. 19/265,572, filed on Jul. 10, 2025.

(60) Provisional application No. 63/689,991, filed on Sep. 3, 2024.

(51) Int. Cl.
　　*F16K 31/60* 　　(2006.01)
　　*F16K 37/00* 　　(2006.01)

(52) U.S. Cl.
　　CPC .......... *F16K 31/607* (2013.01); *F16K 31/602* (2013.01); *F16K 37/0008* (2013.01)

(58) Field of Classification Search
　　CPC ... F16K 31/607; F16K 31/602; F16K 37/0008
　　See application file for complete search history.

(56) References Cited

U.S. PATENT DOCUMENTS

| | | | | |
|---|---|---|---|---|
| 757,072 | A * | 4/1904 | Tokheim | B67D 7/22 |
| | | | | 235/94 R |
| 2,934,311 | A * | 4/1960 | Sjoholm | F16K 5/12 |
| | | | | 239/581.1 |
| 3,354,904 | A * | 11/1967 | Federle | F16K 5/10 |
| | | | | 137/556.6 |
| 3,528,640 | A * | 9/1970 | Smith | F16K 5/0647 |
| | | | | 251/285 |
| 3,695,105 | A * | 10/1972 | Carlson | F16K 5/0207 |
| | | | | 73/1.25 |
| 5,769,118 | A * | 6/1998 | Lenberg | F16K 37/0016 |
| | | | | 137/553 |
| 6,925,958 | B2 * | 8/2005 | Groeneveld | F15B 15/2815 |
| | | | | 116/284 |
| 8,887,655 | B2 * | 11/2014 | Carlson | F16K 37/0008 |
| | | | | 137/553 |

* cited by examiner

*Primary Examiner* — Eric Keasel
(74) *Attorney, Agent, or Firm* — Woodard, Emhardt, Henry, Reeves & Wagner, LLP

(57) ABSTRACT

A valve assembly having a handle and a valve body. The valve assembly includes an indicator and a marker that denote the rotational range and position of the handle relative to the valve body. The indicator generally has a contrasting color compared to the handle to ensure visibility. The indicator can be an inlay embedded on the top side of the handle. The indicator is generally arc-shaped. The alignment of the marker and the indicator can allow users to determine an appropriate direction to rotate the handle that is within the rotational range of the handle.

20 Claims, 14 Drawing Sheets

VALVE HANDLE

CROSS-REFERENCE TO RELATED APPLICATIONS

This application is a continuation of U.S. application Ser. No. 19/265,572, filed Jul. 10, 2025, which claims the benefit of U.S. Provisional Application No. 63/689,991, filed on Sep. 3, 2024, the entire disclosures of which are hereby incorporated by reference.

FIELD OF THE INVENTION

The present disclosure deals with control handles for valves.

BACKGROUND

Valves are generally used to control the flow of fluids in various types of systems, such as in industrial processing, irrigation, residential plumbing, and other settings. Many types of valves can be controlled by opening the valve to allow flow or closing the valve to obstruct flow. For example, many valves can be operated manually using a handle, lever, wheel, pedal, or another device. In some instances, users may not immediately recognize the appropriate way to rotate the handle or another control on the valve. For example, a user may rotate the handle in the wrong direction at first when trying to open or close the valve. Forcing the handle in the wrong direction can damage the valve. Further, some systems require quick valve operation response times. Hesitating to rotate the handle and/or rotating the handle incorrectly can cause a delay when changing the state of the valve.

Thus, there is a need for improvement in this field.

SUMMARY

A unique valve assembly has been developed that can indicate the rotational range and relative position of a handle. The valve assembly generally comprises a valve body, the handle, an indicator, and a marker. In one version, the valve assembly includes a ball valve. The handle is attached to the valve body and configured to rotate about a handle axis relative to the valve body. The handle can be rotated between an open position and a closed position. The indicator can be positioned on an upper portion of the handle. The marker can be positioned on the valve body. Generally, the indicator has a first end and a second end and defines an arc that extends around the handle axis.

The indicator can denote the rotational range of the handle. As the handle rotates, the relative orientation of the indicator with the valve body can represent the position of the valve and handle within the rotational range. Displaying the rotational range and position of the handle can allow users to quickly determine the appropriate direction to rotate the handle. When the handle is rotated to the open position, the first end of the indicator can be aligned with the marker. When the handle is rotated to the closed position, the second end of the indicator can be aligned with the marker. As the indicator rotates relative to the marker, the marker can denote the position of the handle between the open and closed positions.

Alternatively or additionally, the indicator can denote the position of the handle by intersecting a plane defined by the valve body. The valve body can define a body axis that extends through the valve body. The valve axis can be oriented in a transverse direction to the handle axis. The valve body can define the plane to extend through the valve axis and the body axis. When the handle is rotated to the open position, the first end of the indicator can intersect the plane. When the handle is rotated to the closed position, the second end of the indicator can intersect the plane. The plane can additionally extend through the marker.

The indicator can be a color that contrasts with the color of the handle. The marker can be a color that contrasts with the color of the valve body. Such contrasting colors can make the indicator and/or the marker highly visible. Optionally, the indicator can have a textured surface to alter how light reflects from the indicator compared to the handle.

The handle can have a base portion and an elongated portion. The elongated portion can be spaced further away from valve body than the base portion in a direction along the handle axis. Spacing the elongated portion further from the valve body can provide clearance for a user to grab the handle.

The indicator can define a width in a radial direction that is transverse to the arc. In one version, the width can vary from the first end to the second end along the arc. The width can be greater at the first end than at the second end. The width of the indicator at each point along the arc can generally represent the amount that the valve assembly is open. For example, the wider width at the first end can represent an open state of the valve, and the narrower width at the second end can represent a closed state of the valve. The tapered shape of the indicator can help a user to gauge the position of the handle and the state of the valve assembly. Further, the handle can include one or more arrows that indicate directions of rotation of the handle to open and close the valve assembly. The handle can optionally include a tab that protrudes from the base portion of the handle. The tab can be positioned on one end of the indicator to denote the state of the valve when that end of the indicator is aligned with the marker.

In one example, the indicator can be an inlay that is embedded in an outward-facing portion of the handle, such as on an upper portion of the handle. The handle can define a recess to receive the inlay. Further, the indicator can include one or more pegs. The handle can define one or more holes to receive the pegs. The pegs and holes can mechanically couple the indicator and the handle. In one version, the indicator can be removably attached to the handle. Additionally, the valve body can define a slot to receive the marker. The marker can mechanically attach to the valve body by inserting into the slot. In one version, the marker is removably attached to the valve body.

The handle can further include a guide and a punch-out. The guide can direct a tool, such as a drill, that is used to remove the punch-out. The punch-out can be thinner and/or scored around the perimeter to facilitate removing the punch-out from the handle. In one example, the punch-out can define a divot that helps center the tip of a drill bit and/or another part of a tool. Removing the punch-out allows the handle to receive a rod and/or another device that helps provide additional force and/or leverage when turning the handle.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
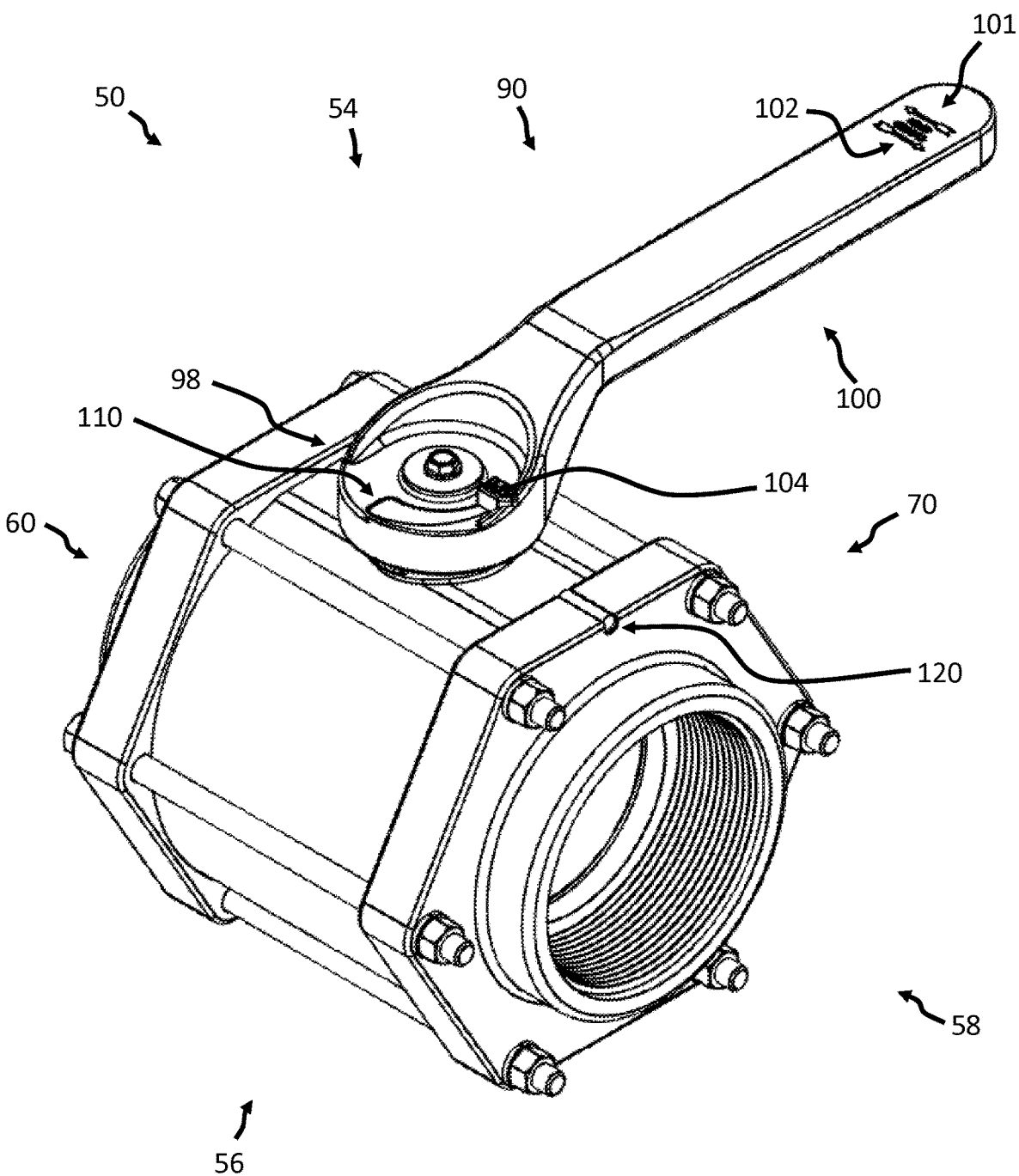
FIG. 1 is a perspective view of a valve assembly according to one embodiment.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Directional terms, such as forward, rearward, top, bottom, etc., are used in this description with reference to the specific embodiment shown and used for purposes of clarity. It should be recognized that these terms are not meant to be limiting.

FIG. 1 illustrates a valve assembly 50 according to one embodiment. Valve assembly 50 is generally configured to control flow of fluid along a pipe, such as in plumbing and/or irrigation systems. Valve assembly 50 can include a ball valve, butterfly valve, globe valve, gate valve, pinch valve, and/or another type of valve. Valve assembly 50 generally has a valve body 70 and a handle 90. Valve body 70 can structurally support valve assembly 50 and can attach to pipes to support fluid flow. Handle 90 is rotatably attached to valve body 70. Rotating handle 90 relative to valve body 70 allows a user to control the flow of fluid through valve body 70. For example, rotating the handle 90 can open or close valve assembly 50.

Figure 2:
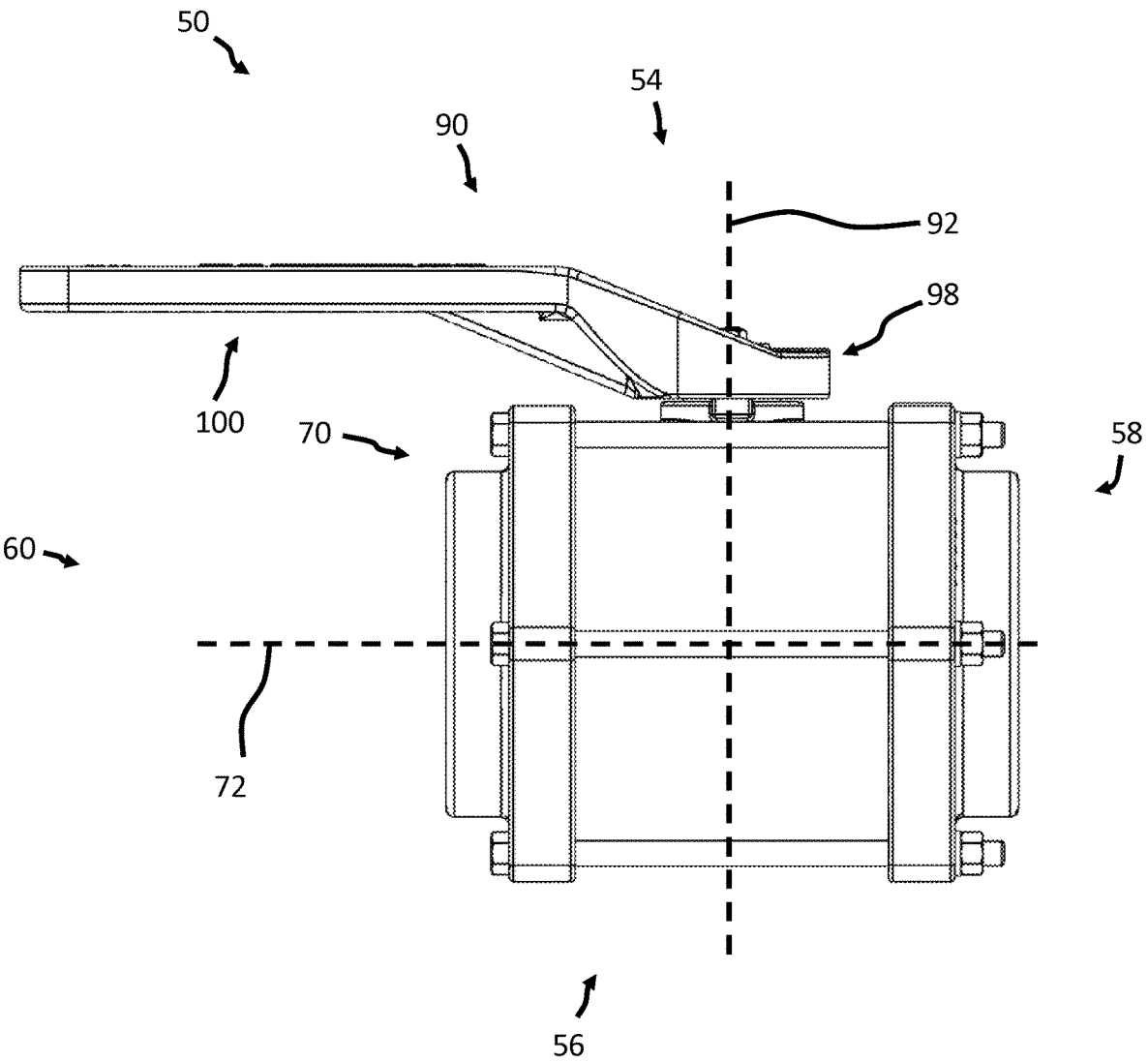
FIG. 2 is a side elevation view of the FIG. 1 valve assembly.

Referring to FIGS. 1 and 2, valve assembly 50 has a top side 54 and a bottom side 56. Valve assembly 50 further has a front side 58 and a rear side 60. Valve body 70 defines a body axis 72 that extends through front side 58 and rear side 60 along the center of valve body 70. Water and/or another fluid can flow through valve assembly 50 generally along body axis 72, such as from front side 58 to rear side 60 and vice versa. As should be appreciated, top side 54, bottom side 56, front side 58, and rear side 60 are relative terms, and valve assembly 50 could be arranged in any directional orientation.

Handle 90 is generally positioned on an outer portion of valve assembly 50 that generally faces a user. In a preferred embodiment, handle 90 is positioned on top side 54 of valve assembly 50. In other embodiments, handle 90 can be positioned on bottom side 56 or on a lateral side of valve assembly 50. For example, valve assembly 50 can be mounted on a wall or ceiling, and bottom side 56 or a lateral side of valve assembly 50 can generally face a user. Positioning handle 90 on top side 54 or another side that faces the user can facilitate visibility and accessibility of handle 90 to users.

As illustrated, valve assembly 50 further includes an indicator 110. Indicator 110 generally denotes the rotational range of handle 90. Indicator 110 can extend in an arc shape that corresponds to a rotational path of handle 90. The color of indicator 110 generally contrasts with the color of handle 90 to make indicator 110 highly visible to users. As handle 90 rotates, different portions of indicator 110 generally align with body axis 72 and/or the direction of pipes attached to valve assembly 50. The portion of indicator 110 that aligns with body axis 72 generally gauges the position of handle 90 within the rotational range. For example, when viewing valve assembly 50 from top side 56, a user can determine the position of handle 90 from the point where body axis 72 generally intersects indicator 110.

Optionally, valve assembly 50 further includes a marker 120. Marker 120 is typically positioned on valve body 70 and remains stationary as handle 90 and indicator 110 rotate. The color of marker 120 generally contrasts the color of the valve body 70 to make marker 120 highly visible. Different portions of indicator 110 align with marker 120 as handle 90 rotates. Marker 120 generally assists in gauging the orientation of handle 90 within the rotational range. The orientation of indicator 110 relative to marker 120 can represent the rotational position of handle 90 and valve assembly 50. Marker 120 can be a piece of material in a different color and secured to the valve body, a decal or sticker, a paint marking or the like.

Indicator 110 or indicator 110 and marker 120 together can display the rotational range and position of handle 90 relative to valve body 70. Indicator 110 and marker 120 can allow a user to quickly determine which direction to rotate handle 90 to change the state of valve assembly 50 (e.g., closing from an open state or opening from a closed state). By allowing the user to quickly determine this, indicator 110 and marker 120 can prevent the user from forcing handle 90 to rotate in the wrong direction or outside the rotational range, which can damage valve assembly 50. Further, indicator 110 and marker 120 can help the user to respond at precise instances to open or close valve assembly 50.

Valve assembly 50 can optionally further include an open arrow 101, a close arrow 102, and/or a tab 104. Open arrow 101, close arrow 102 and tab 104 may optionally be labelled with text such as the words "open," "close," and "off." Arrows 101, 102 can point in a direction for a user to rotate handle 90 to open or close valve assembly 50. In the illustrated example, handle 90 includes both an open arrow 101 displaying the direction of rotation to open valve assembly 50 and a close arrow 102 displaying the direction of rotation to close valve assembly 50. Tab 104 can indicate the state of valve assembly 50. In the illustrated example, tab 104 is aligned with marker 120 when valve assembly 50 is in a closed state (e.g., off). Arrows 101, 102 and tab 104 can further aid the user to quickly determine a direction to rotate handle 90 and/or the present state of valve assembly 50.

As shown in FIG. 2, valve assembly 50 defines a handle axis 92. Handle 90 is configured to rotate about handle axis 92. Handle axis 92 can be oriented transverse to body axis 72. In the illustrated example, handle axis 92 extends through bottom side 56 and top side 54 of valve assembly 50.

Handle 90 generally includes a base portion 98 and an elongated portion 100. Base portion 98 generally attaches to valve body 70 to support rotation of handle 90. Elongated portion 100 generally extends away from base portion 98 and provides an area for a user to grip handle 90. In the illustrated example, elongated portion 100 is spaced further away or offset from valve body 70 relative to base portion 98. In other words, a vertical distance between elongated portion 100 and valve body 70 is greater than a vertical distance between base portion 98 and valve body 70. The increased space between elongated portion 100 and valve body 70 can provide greater clearance for a user to grip handle 90 on elongated portion 100.

Figure 3:
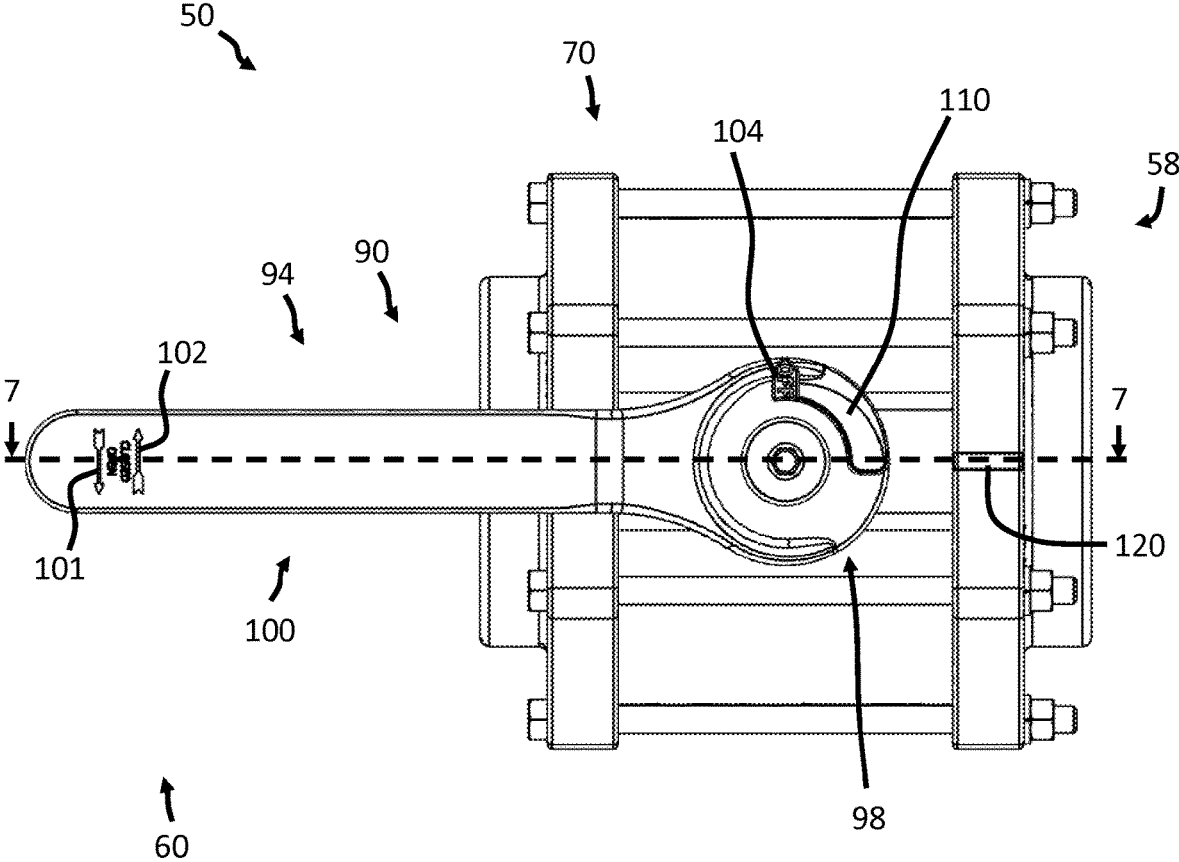
FIG. 3 is a top plan view of the FIG. 1 valve assembly with a handle in an open position.
Figure 4:
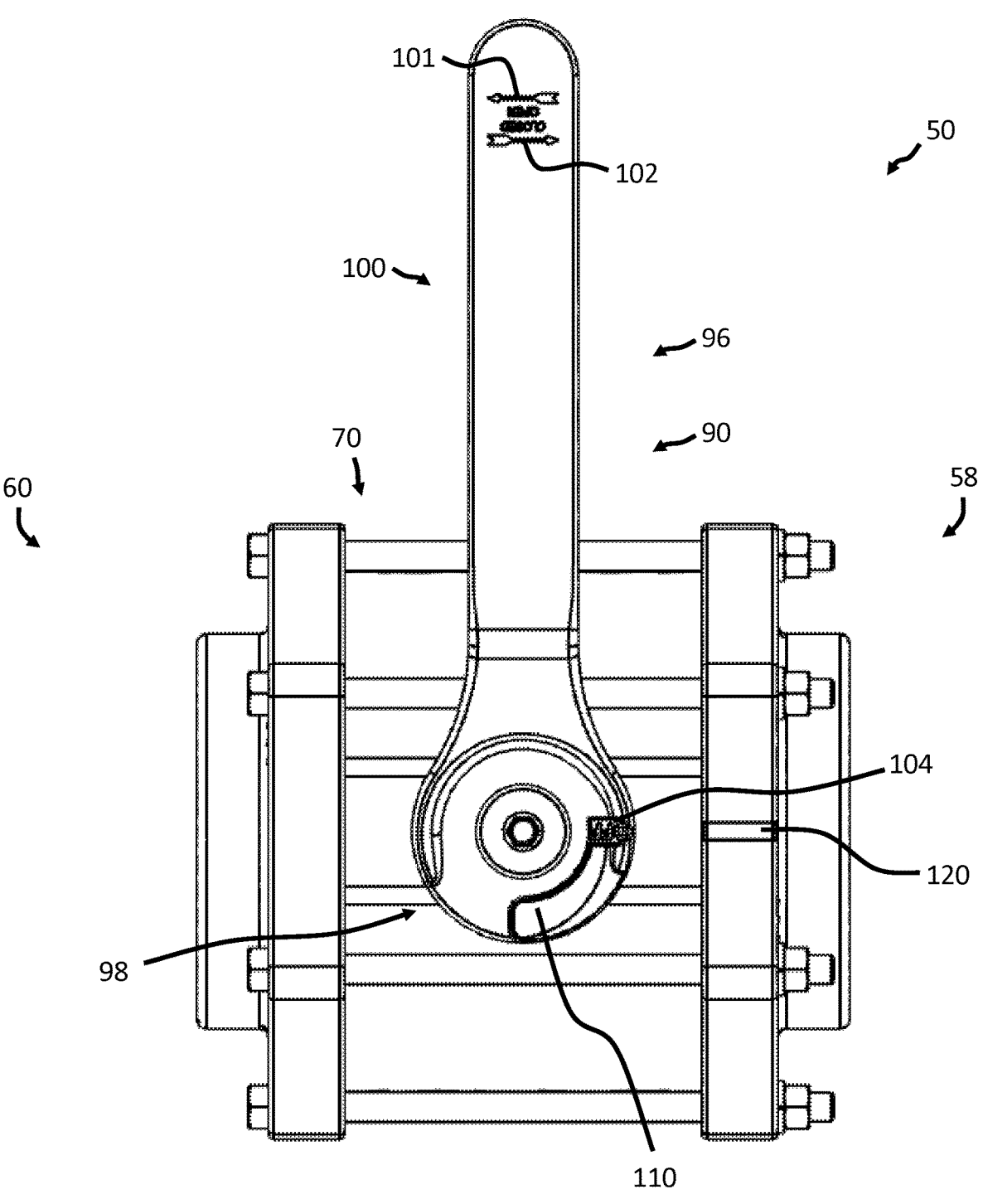
FIG. 4 is a top plan view of the FIG. 3 valve assembly with the handle in a closed position.

Referring to FIGS. 3 and 4, handle 90 is rotatable between an open position 94 and a closed position 96. In one version, handle 90 can follow a common scheme for rotating between open and closed positions 94 and 96. For example, handle 90 can be oriented parallel to body axis 72 and/or pipes connected to valve body 70 when in open position 94. In closed position 96, handle 90 can be oriented perpendicular to such pipes and/or body axis 72. Open position 94 of handle 90 corresponds to an open or on state of valve assembly 50. Closed position 96 of handle 90 corresponds to a closed or off state of valve assembly 50. Indicator 110 and marker 120 can help users quickly determine whether handle 90 is in open position 94, closed position 96 or in an intermediate (i.e., partially open) position. Using indicator 110 and marker 120, a user can quickly determine which way to rotate handle 90 between open and closed positions 94 and 96 without damaging valve assembly 50.

As shown in FIG. 3, handle 90 can be rotated toward rear side 60 of valve assembly 50 in open position 94. Handle 90 can be aligned with body axis 72 in open position 94. As shown in FIG. 4, handle 90 can be oriented transverse to body axis 72 in closed position 96. In the illustrated example, valve assembly 50 utilizes a quarter-turn handle 90, and handle 90 in open position 94 is generally oriented at a 90-degree angle to handle 90 in closed position 96. Alternatively, handle 90 could be arranged to rotate in other ways or across another range of rotation.

Figure 5:
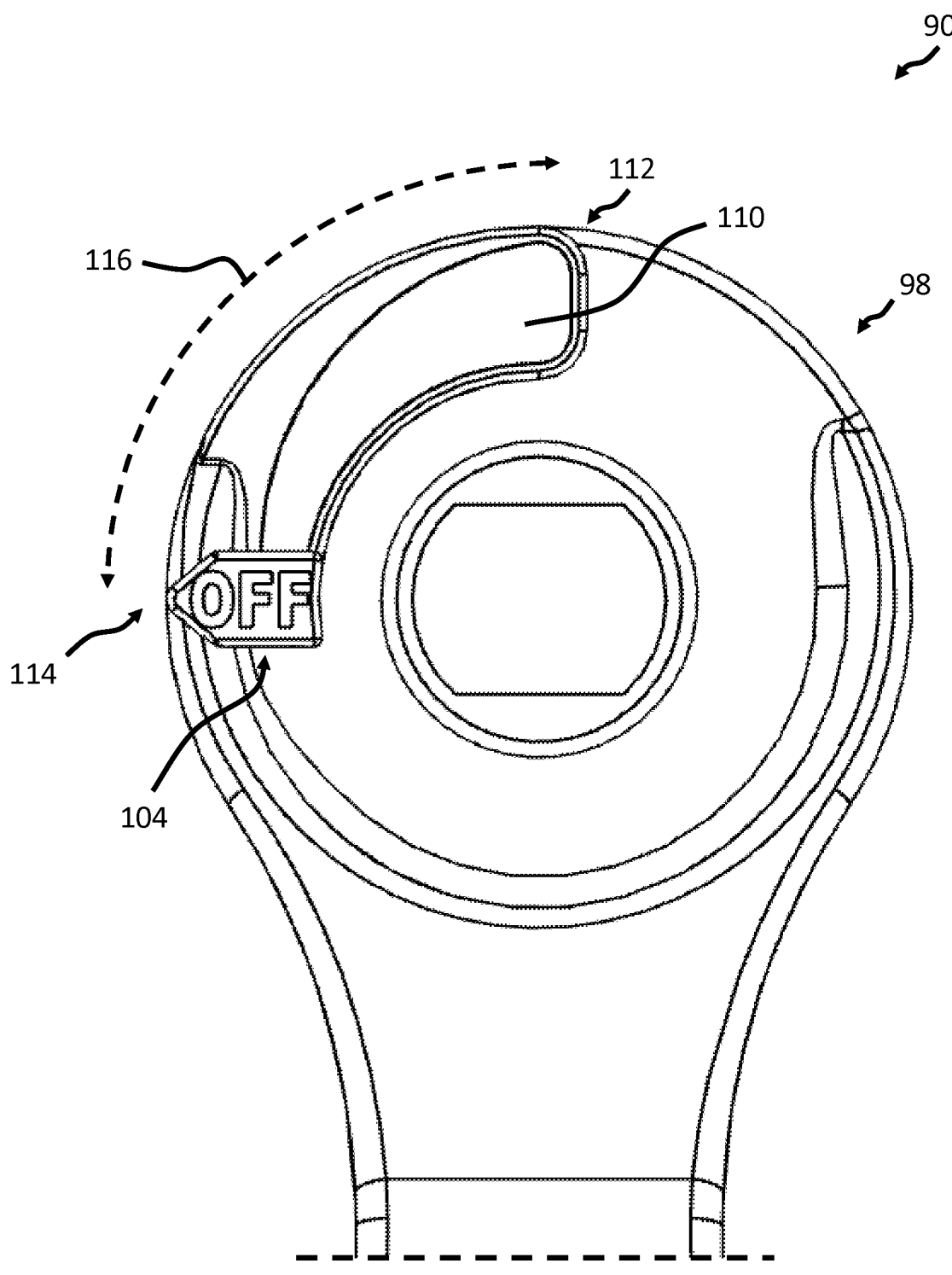
FIG. 5 is a top plan view of the FIG. 3 handle and an indicator, components of the FIG. 1 valve assembly.

FIG. 5 shows a closer view of handle 90 and indicator 110. As shown, indicator 110 generally has a first end 112 and a second end 114. Indicator 110 generally curves around handle axis 92 from first end 112 to second end 114. First end 112 and second end 114 can correspond to bounds on the rotational range of handle 90 relative to valve body 70. Indicator 110 generally defines an arc 116 that extends around handle axis 92 from first end 112 to second end 114. Arc 116 can be a segment of a circle. Arc 116 generally denotes the range of rotation of handle 90. For example, arc 116 can extend over an angle up to 45 degrees, up to 90 degrees, up to 180 degrees, or another angle. Such an angle can approximate or be exactly the same as the angle defined between handle 90 in open position 94 and handle 90 in closed position 96.

As a user rotates handle 90, indicator 110 moves relative to marker 120. The portion of indicator 110 positioned closest to marker 120 is generally aligned with marker 120. Marker 120 is used to gauge the rotational position of handle 90 based on the portion of indicator 110 that is aligned with marker 120 based on the handle and valve position. Further, the portion of indicator 110 can be aligned with marker 120 in a lateral direction, such as a direction that is perpendicular to both body axis 72 and handle axis 92. In one example, valve body 70 can define a plane extending through marker 120 and body axis 72 and/or extending through body axis 72 and handle axis 92 (e.g., cross-sectional plane of FIG. 7 that is taken along line 7-7 in FIG. 3). In this example, a portion of indicator 110 is aligned with marker 120 when that portion intersects the plane and is positioned furthest toward front side 58. In other examples, marker 120 could be positioned on a different part of valve body 70 and indicator 110 could be aligned with marker 120 along a different direction and/or through a different plane.

When a user rotates handle 90 into open position 94, as shown in FIG. 3, first end 112 of indicator 110 is aligned with marker 120. First end 112 can represent an open or on state of valve assembly 50. Conversely, second end 114 of indicator 110 is aligned with marker 120 when handle 90 is rotated into closed position 96, as shown in FIG. 4. Second end 114 can represent a closed or off state of valve assembly 50. When a portion of indicator 110 between first end 112 and second end 114 is aligned with marker 120, handle 90 is in a corresponding orientation between open position 94 and closed position 96. By observing that first end 112 of indicator 110 is aligned with marker 120, a user will understand that handle 90 must be rotated clockwise to reach closed position 96. Similarly, a user will understand that handle 90 must be rotated counterclockwise when second end 114 of indicator 110 is aligned with marker 120. The position of indicator 110 relative to marker 120 may provide all the information a user needs. For instance, the user may know a certain valve must be switched from on to off, or vice versa. In such a scenario, the user only needs to know which direction a handle 90 should be rotated to change the state of the valve. In this way, the combination of a highly visible marker 120 and indicator 110 provides the necessary information to the user.

In the illustrated examples, optional tab 104 is positioned at second end 114 of indicator 110. Tab 104 can include lettering or indicia that further communicate that valve assembly 50 is closed or off. Tab 104 can be pointed or arrow-shaped and point in a direction toward marker 120 when tab 104 and marker 120 are aligned. Alternately or additionally, handle 90 can include a tab 104 at first end 112 of indicator 110 that denotes that valve assembly 50 is open or on. To further aid the user, close arrow 102 can communicate to the user the direction to rotate handle 90 from open position 94 to closed position 96. Conversely, a user can rotate handle 90 in the direction indicated by open arrow 101 to move handle 90 into open position 94 from closed position 96.

Indicator 110 can further communicate the state of valve assembly 50 by varying the shape and/or size of indicator 110 at various points. Indicator 110 can define a width in a direction transverse to arc 116. For example, the width of indicator 110 can be defined in a radial direction relative to handle axis 92. In the illustrated example, the width of indicator 110 can vary from first end 112 to second end 114. Indicator 110 can taper in width from first end 112 to second end 114. The tapered shape of indicator 110 can help users identify the state of valve assembly 50. For example, the width of indicator 110 at a certain point can represent how open valve assembly 50 is at that position. The larger width at first end 112 can represent valve assembly 50 being fully open and handle 90 being in open position 94. The smaller width at second end 114 can represent valve assembly 50 being fully closed and handle 90 being in closed position 96. Observing the width of indicator 110 where indicator 110 is aligned with marker 120 can allow users to gauge the state of valve assembly 50 and/or the relative position of handle 90 within the range of rotation. In this way, the tapered width of indicator 110 can further aid a user to determine the appropriate way to rotate handle 90.

Figure 6:
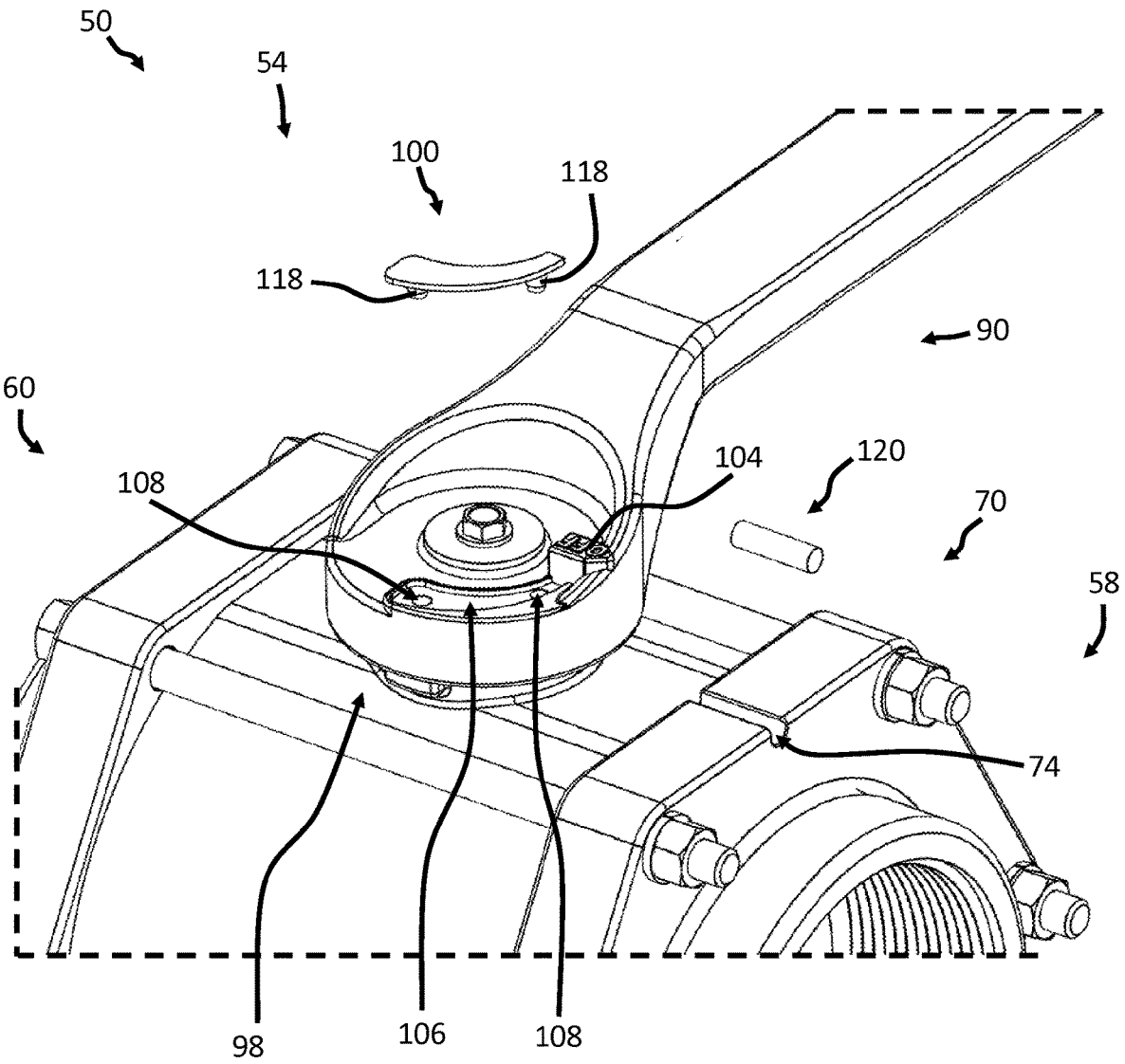
FIG. 6 is a partially exploded view of the FIG. 1 valve assembly.

FIG. 6 shows a partially exploded view of valve assembly 50. As shown, indicator 110 and marker 120 are separated from the rest of valve assembly 50. In the illustrated embodiment, indicator 110 and marker 120 can be separate pieces from handle 90 and valve body 70. Using separate pieces for indicator 110 and marker 120 allows indicator 110 and marker 120 to be made of different materials than the rest of valve assembly 50 and/or to be easily replaced. Alternatively, indicator 110 can be integrally formed with handle 90, and/or marker 120 can be integrally formed with valve body 70.

In the illustrated embodiment, indicator 110 is an inlay that attaches to handle 90 and partially embeds into an upper portion of handle 90. Handle 90 can define a recess 106 configured to receive indicator 110. In one version, indicator 110 can be formed as a separate piece that can then secure to handle 90 in recess 106 through a friction fit and/or a snap-fit connection. In an alternate version, indicator 110 can be attached to handle 90 using an adhesive. In yet another alternate version, indicator 110 can be molded in recess 106. For instance, resin, epoxy, and/or other base materials can be cured within and/or fused in recess 106 to form indicator 110. Indicator 110 can further include one or more pegs 118 that extend outward. Handle 90 can define a hole 108 for each peg 118 on indicator 110. Holes 108 are generally configured to receive pegs 118. Indicator 110 can couple to handle 90 through a friction fit and/or snap-fit connection between pegs 118 and holes 108. Indicator 110 can be permanently attached to handle 90 or removably attached. Using a separate part for indicator 110 can allow users to swap indicators 110 to change color and/or other aspects of the appearance. For example, users may utilize different colored inlays as indicators 110 to help distinguish different valve assemblies 50.

Indicator 110 is generally highly visible, particularly in comparison to handle 90. Indicator 110 can be colored a bright and/or saturated color that is easily visible to users. The color of indicator 110 preferably contrasts with the color of handle 90 to make indicator 110 highly visible. In one version, handle 90 and indicator 110 can both be brightly colored, but the colors of handle 90 and indicator 110 can contrast. As examples, handle 90 can be colored a bright yellow, gold, orange, red, white, green, or blue color. Among other examples, indicator 110 can be colored a bright yellow, gold, orange, red, white, green, or blue color that is different than the color of handle 90. For instance, handle 90 and indicator 110 can utilize yellow-green, gold-green, orange-yellow, orange-red, blue-yellow, red-white, blue-white, green-white, and/or other color combinations. Indicator 110 may be made of highly reflective material. In one example, indicator 110 can be more reflective than handle 90. Indicator 110 may further have a textured surface that alters the reflection of light from indicator 110 and/or the tactile feel of indicator 110 on top side 54. Such a textured surface can make indicator 110 more visible and/or help a user better distinguish indicator 110 from handle 90.

As illustrated, valve body 70 defines a slot 74 that receives marker 120. In the illustrated example, marker 120 is generally cylindrically shaped. Marker 120 can attach to valve body 70 through a friction fit and/or a snap-fit connection within slot 74. In one example, marker 120 is removably attached to valve body 70. Using a removable marker 120 can allow users to customize the color of marker 120 to distinguish different valve assemblies. Users can utilize various combinations of indicators 110 and markers 120 to denote different information about valve assembly 50.

Marker 120 can be highly visible to users, particularly in comparison to valve body 70. In one example, marker 120 and indicator 110 are the same color, made of the same material, and/or reflect the same amount of light. Marker 120 can be colored a bright and/or saturated color. In another example, the color of marker 120 matches the color of handle 90. Marker 120 can be made of a highly reflective material and/or be textured to alter the reflection of light. The highly visible marker 120 in combination with the highly visible indicator 110 helps users to quickly visually locate the indicator 110 and marker 120 and to then evaluate the state of valve assembly 50.

Figure 7:
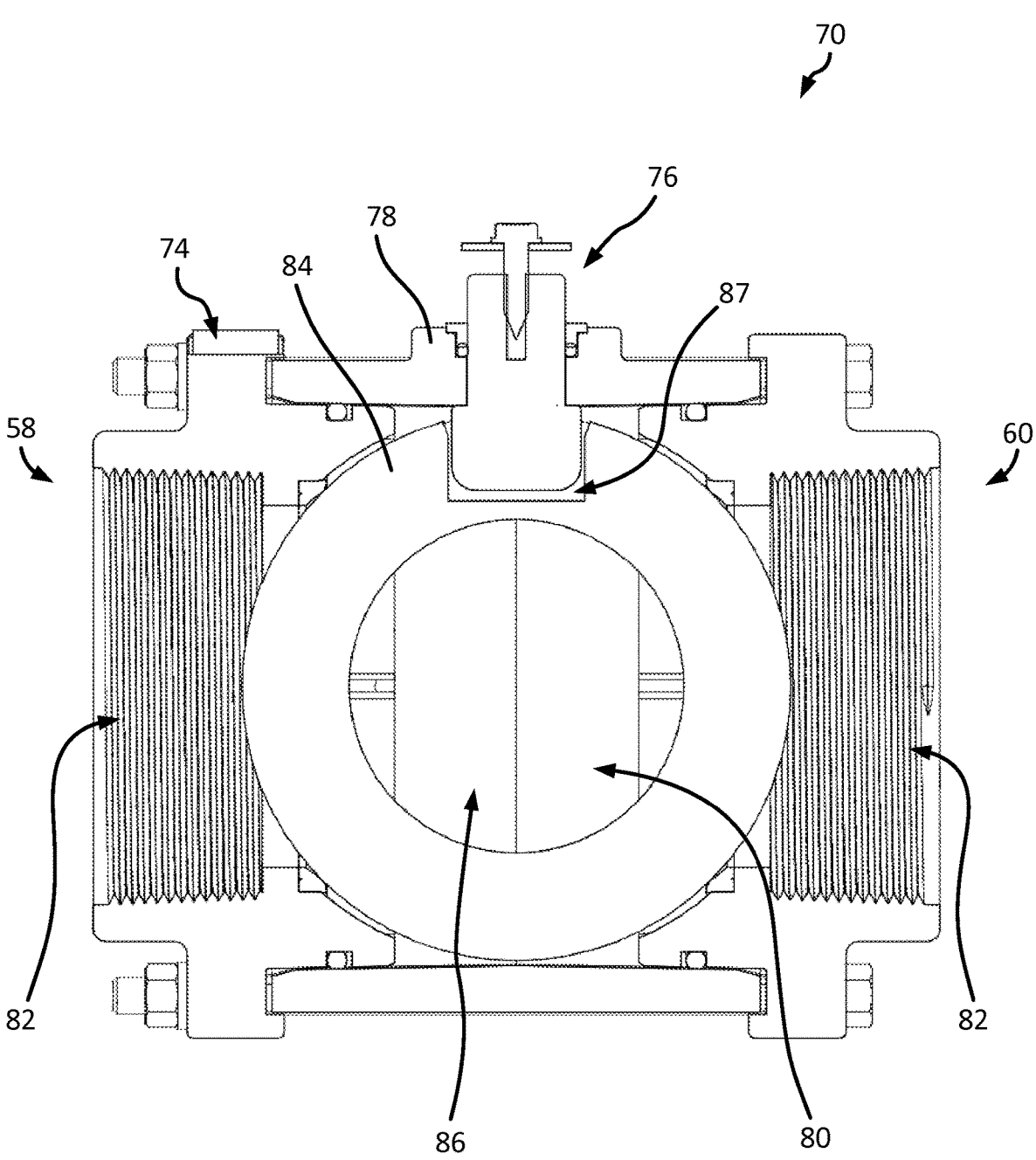
FIG. 7 is a cross-sectional view of a valve body, a component of the FIG. 1 valve assembly.

Referring to cross-sectional FIG. 7, valve body 70 can include a stem 76, a collar 78, and a ball 84. Valve body 70 can define a chamber 80 on the inside. Ball 84 defines an opening 86 and can allow or impede flow through chamber 80. Valve assembly 50 generally includes a valve in the form of ball 84, and rotating ball 84 generally opens or closes the valve. Stem 76 connects handle 90 to ball 84, such as through a notch 87 in ball 84. Collar 78 supports stem 76 to rotate relative to valve body 70. Stem 76, collar 78, and ball 84 together allow handle 90 to control the state of valve assembly 50. Rotating the handle to the open position opens the valve to allow fluid flow through the valve body, and rotating the handle to the closed position closes the valve to obstruct fluid flow through the valve body. As should be appreciated, valve assembly 50 could use another device to allow and block fluid flow through valve body 70, such as a gate, disc, or plug as examples. Valve assembly 50 can further include internal threads 82 to support mechanical connections to pipes, fittings, spigots, nozzles, and/or other parts of a plumbing system.

Figure 8:
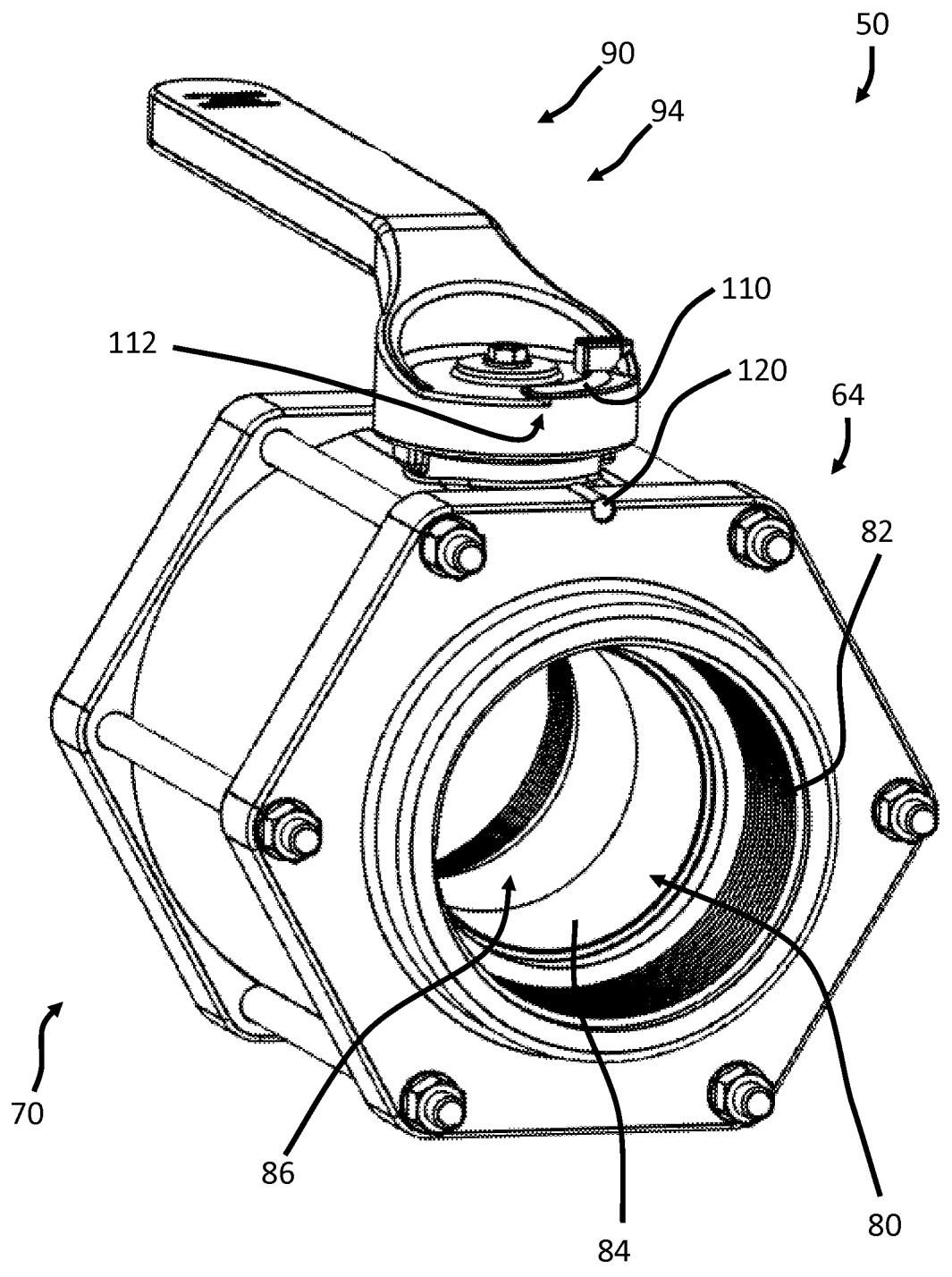
FIG. 8 is a front perspective view of the FIG. 1 valve assembly in an open state.
Figure 9:
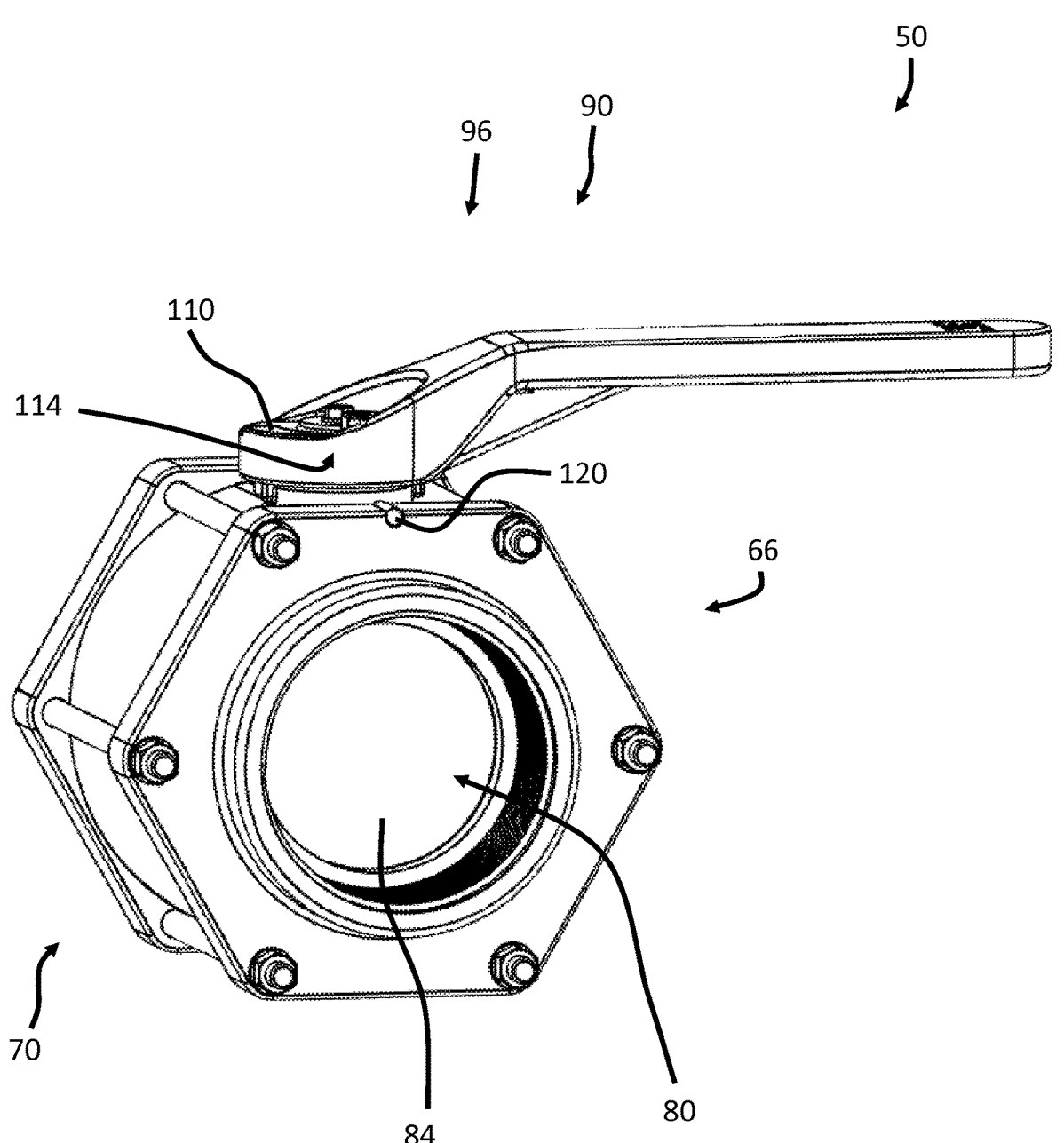
FIG. 9 is a front perspective view of the FIG. 1 valve assembly in a closed state.

FIGS. 8 and 9 illustrate valve assembly 50 in an open state 64 and a closed state 66. In FIG. 8, valve assembly 50 is in open state 64. In open state 64, valve body 70 defines an open channel extending from front side 58 to rear side 60. Opening 86 in ball 84 can be oriented along body axis 72 and can allow chamber 80 to be a continuous open space. First end 112 of indicator 110 can be aligned with marker 120 when valve assembly 50 is in open state 64. In FIG. 9, valve assembly 50 is in closed state 66. In closed state 66, ball 84 blocks fluid flow between front side 58 and rear side 60, optionally in combination with one or more seals. As shown, tab 104 on handle 90 can be aligned with marker 120, and second end 114 of indicator 110 can be aligned with marker 120. The orientation of indicator 110 relative to marker 120 generally corresponds to the orientation of ball 84. Because handle 90 and ball 84 are fixed together, the range of rotation denoted by indicator 110 applies to both handle 90 and ball 84. In the illustrated example, the 90-degree (e.g., quarter turn) range of rotation shown by indicator 110 corresponds to the range of rotation used for ball 84, such as in a typical ball valve. In other examples, valve assembly 50 can utilize a different type of valve and indicator 110 can show a different range of motion that corresponds to a plug, disc, gate, or other device used in that type of valve.

Figure 10:
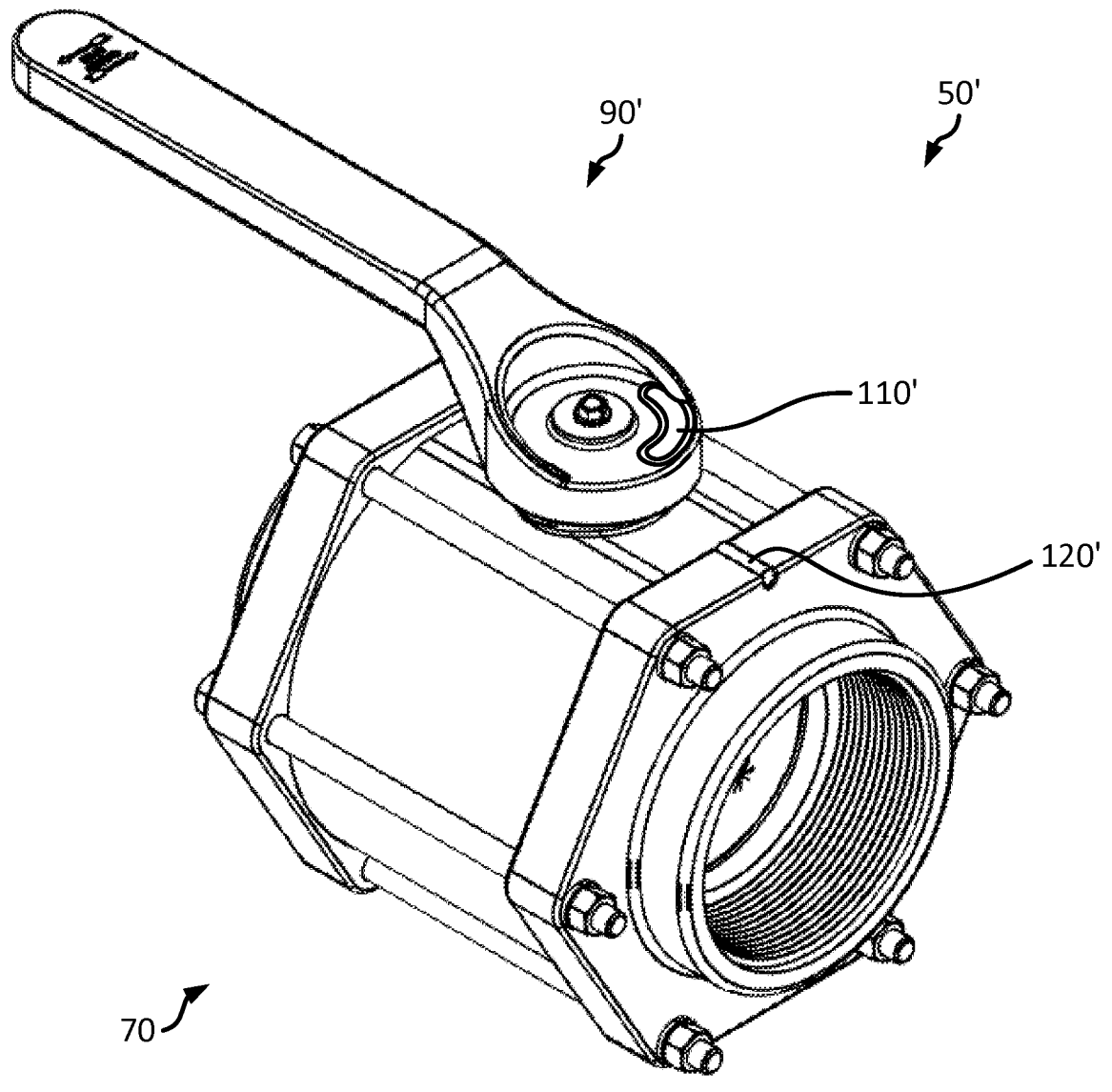
FIG. 10 is a perspective view of another embodiment of the FIG. 1 valve assembly.

Referring to FIG. 10, valve assembly 50 can utilize a variety of types of handles 90, indicators 110, and/or markers 120. In the embodiment shown in FIGS. 1 through 9, indicator 110 has a tapered shape along arc 116. In the FIG. 10 embodiment, indicator 110' has a consistent width along the majority of arc 116. The shape of indicator 110 can vary while still allowing indicator 110 to denote the range of rotation of handle 90. Further, valve assembly 50 can use an indicator 110 having a different color, material, surface texture, and/or other properties than in the illustrated embodiments. Similarly, valve assembly 50 can use a marker 120' having a different color, material, surface texture, and/or other properties than in the illustrated embodiments.

As shown, handle 90' in FIG. 10 does not include tab 104. The simplified design of handle 90' in FIG. 10, compared to handle 90 in FIG. 1, can allow indicator 110 to be more visible to a user. As noted, using a highly visible indicator 110 on top side of handle 90 and highly visible marker 120 on valve body 70, enables a user to quickly observe the necessary information to determine the appropriate way to rotate handle 90. Tab 104 and/or arrows 101, 102 provide additional information to users; however, a user may only need to look at indicator 110 and marker 120 to determine how to rotate handle 90 within the rotational range.

FIGS. 11 through 16 illustrate additional examples of handle 90 which include a handle 190 and a handle 190'. Handle 190 generally attaches to and interacts with valve assembly 50 in the same way as handle 90. As should be appreciated, valve assembly 50 can utilize handle 90 having any combination of features from handle 90', handle 190, and/or handle 190'. For example, handle 190 can include tab 104 and hole 108 as illustrated in previous figures. Further, handle 190 can receive indicator 110 as illustrated in previous figures.

Figures 12, 13:
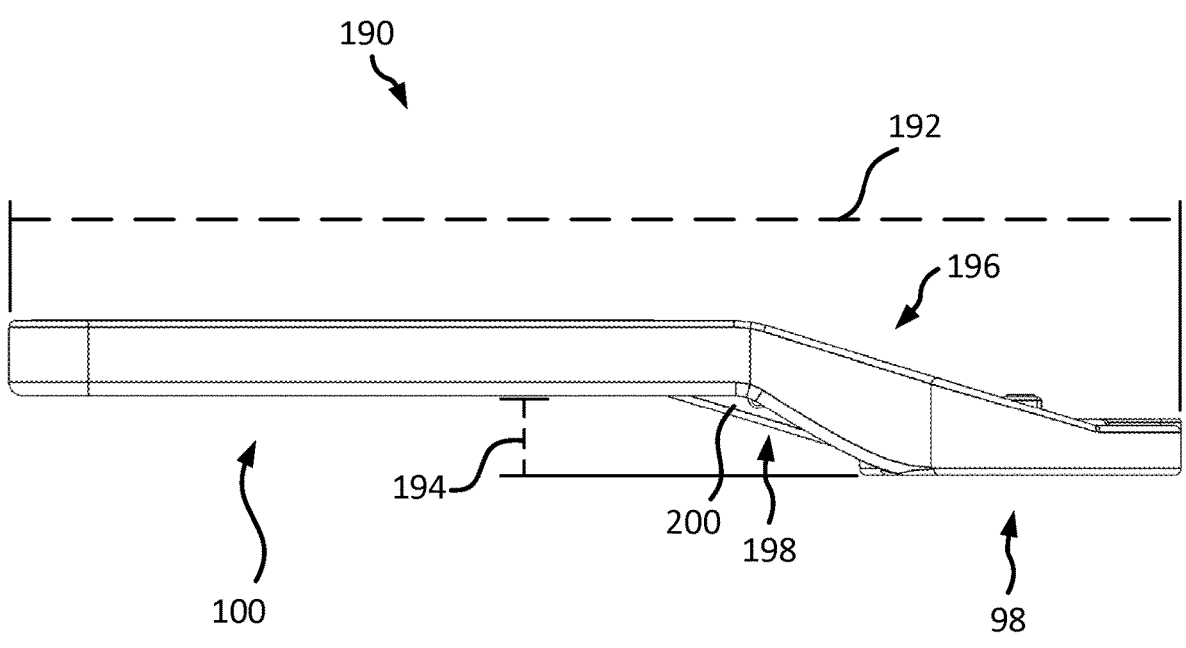
FIG. 12 is a side elevation view of the FIG. 11 handle.
FIG. 13 is a bottom plan view of the FIG. 11 handle.

Referring to FIG. 12, handle 190 defines a length 192. Length 192 generally extends across base portion 98 and elongated portion 100. Handle 190 can be shaped in a variety of sizes. As some examples, length 192 can be up to 3.5 inches, up to 6 inches, up to 7 inches, up to 10 inches, up to 11 inches, up to 12 inches, and/or another amount. Handles 190 with different lengths 192 can be better suited for different circumstances. For instance, a shorter handle 190 can be used in smaller and/or a more cramped environments. As another example, a longer handle 190 can be used when greater force is needed to open or close valve assembly 50. In some examples, different versions of handle 190 have the same sized base portion 98 but different sized elongated portions 100. In other words, elongated portion 100 can be lengthened or shortened in different versions of handle 190.

Handle 190 can further define a height 194. Similar to handle 90 in FIG. 1, elongated portion 100 of handle 190 can be vertically offset from yet parallel to base portion 98. Height 194 is generally the distance that elongated portion 100 is raised above base portion 98. Raising elongated portion 100 in this way can provide additional space between the handle and valve body, providing more clearance for a user to grab handle 190. As shown, handle 190 includes a transition portion 196 that extends between base portion 98 and elongated portion 100. In the illustrated example, transition portion 196 is angled relative to base portion 98 and elongated portion 100. Transition portion 196 allows elongated portion 100 to be offset from base portion 98 while being oriented parallel to base portion 98. In another example, elongated portion 100 can extend at an angle relative to base portion 98, such as at the same angle as transition portion 196 and/or another angle. Orienting elongated portion 100 at an angle relative to base portion 98 can provide additional clearance and allow a user to more easily grip elongated portion 100 compared to a parallel orientation.

As shown in FIGS. 12 and 13, handle 190 can include one or more ribs 198. Ribs 198 generally strengthen handle 190. Ribs 198 generally provide additional material to prevent handle 190 from bending, buckling, and/or deforming in other ways. In one example, elongated portion 100 can be partially hollow with ribs 198 extending through a hollow internal space on elongated portion 100. In the illustrated example, ribs 198 are positioned at various points along transition portion 196 and along elongated portion 100. Ribs 198 can include a longitudinal rib 200 and a lateral rib 202. Longitudinal rib 200 generally extends along length 192 on elongated portion 100. Lateral rib 202 generally extends across elongated portion 100 in a transverse direction to longitudinal rib 200. In one example, handle 190 includes one longitudinal rib 200 positioned centrally and along transition portion and a majority of elongated portion 100. In this example, handle 190 includes multiple lateral ribs 202 positioned on elongated portion 100 at multiple points along length 192. Further, in the illustrated example, longitudinal rib 200 can extend a greater distance from handle 190 than lateral ribs 202. For instance, longitudinal rib 200 can extend down further than lateral ribs 202 near transition portion 196. The combination of longitudinal rib 200 and lateral ribs 202 can provide significant structural support for handle 190 to withstand large torques. For instance, with such an arrangement of ribs 198, handle 190 can be used when large amounts of force are needed to open and close valve assembly 50.

Handle 190 can further include a guide 206, a punch-out 208, and a divot 210. In some examples, users may need a way to impart more torque and/or otherwise improve the mechanical advantage for rotating handle 190. Guide 206 and punch-out 208 can help a user to create a hole in handle 190 to receive a rod and/or another device. For example, inserting the rod into the hole can allow the user to turn handle 190 with greater torque than without the rod. In other words, the rod provides greater mechanical advantage for users to turn handle 190 than elongated portion 100 alone. In another example, the rod can allow the user to push handle 190 with more force and/or from a more natural position compared to manually turning handle 90 alone. For instance, the rod can help the user turn handle 190 if valve assembly 50 is installed low to the ground and/or in a location that is hard to reach.

Guide 206 is generally positioned on an end of elongated portion 100 opposite base portion 98. Guide 206 can direct users to drill through and/or remove material in other ways from handle 190. Guide 206 can be formed in a similar way as ribs 198. For instance, guide 206 can extend from handle 190 at a similar distance and with a similar thickness to ribs 198. Further, guide 206 can intersect ribs 198 and can help strengthen handle 190 in cooperation with ribs 198. Guide 206 generally defines a space for a user to insert a tool. For instance, guide 206 can be configured to receive a drill bit. In one example, guide 206 can define a circular area with a diameter of half an inch. The size of the rod can correspond to the size of the circular area. Further, guide 206 can help align and/or secure the rod to handle 190. For instance, guide 206 can limit or prevent the rod from tilting relative to handle 190. As another example, guide 206 can couple to the rod through a friction fit and/or in another way.

Punch-out 208 is a portion of handle 190 that can be removed. In one example, punch-out 208 can be thinner than the rest of handle 190. In another example, the boundary around punch-out 208 can be perforated and/or scored to help remove punch-out 208. Punch-out 208 can be removed from handle 190 in a variety of ways. In one example, punch-out 208 can be removed using a drill and/or another tool that destroys punch-out 208. In another example, punch-out 208 can be removed by a tool that pushes and breaks punch-out 208 from handle 190. In the illustrated example, punch-out 208 can define a divot 210. Divot 210 can allow a user to align a tool before removing punch-out 208. For instance, divot 210 can be shaped to receive and center a drill bit before a user drills through punch-out 208.

Figure 11:
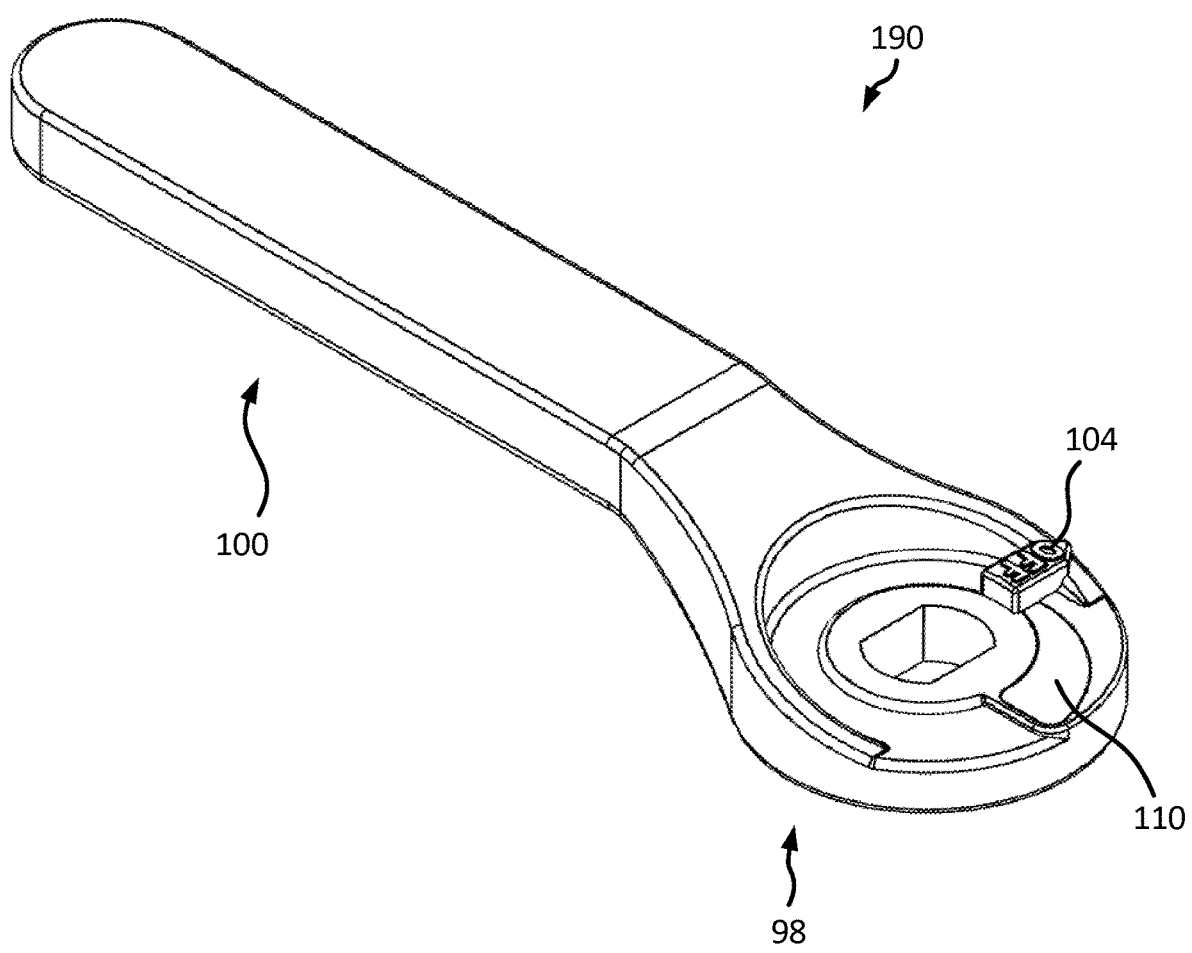
FIG. 11 is a perspective view of another embodiment of the FIG. 3 handle.
Figure 14:
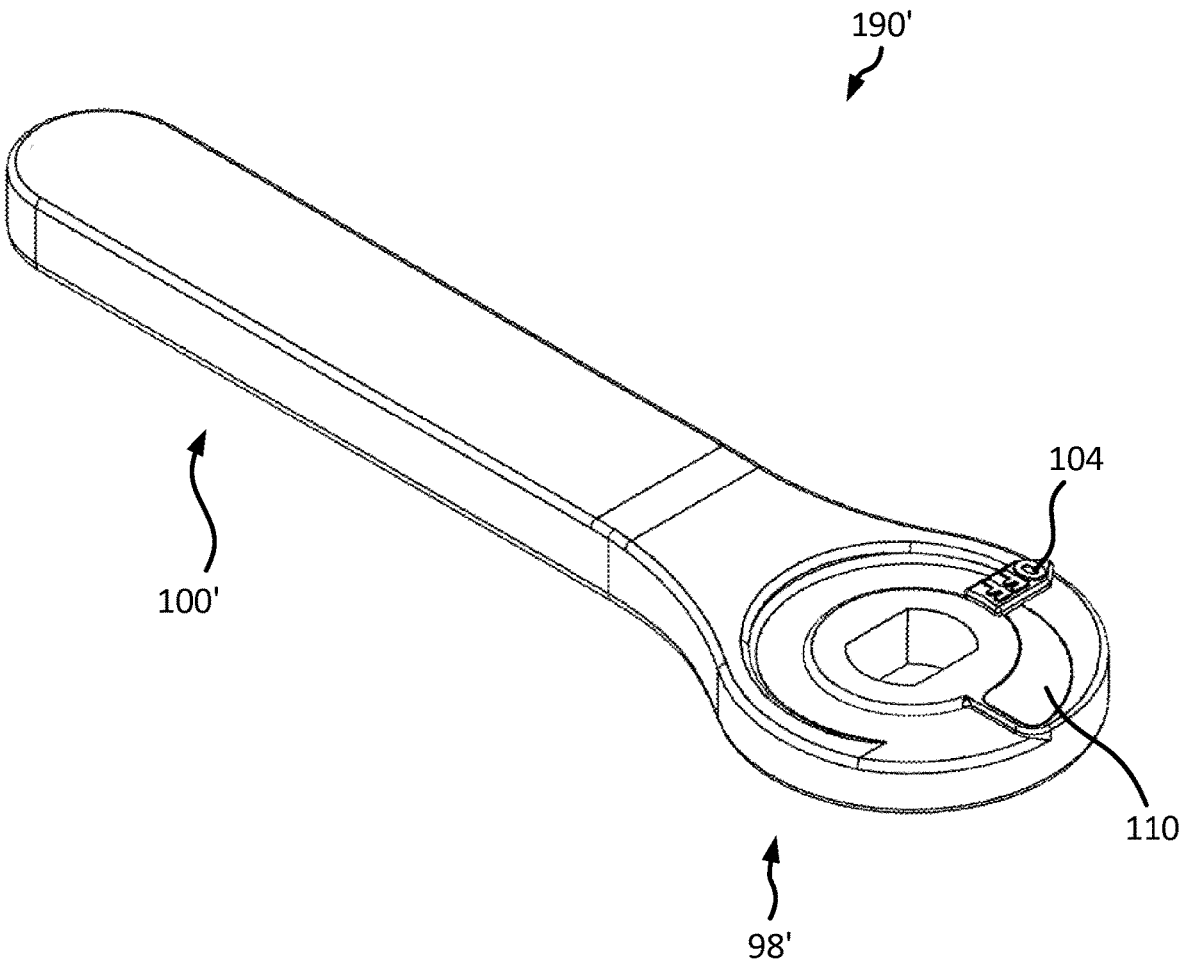
FIG. 14 is a perspective view of yet another embodiment of the FIG. 3 handle.
Figure 15:
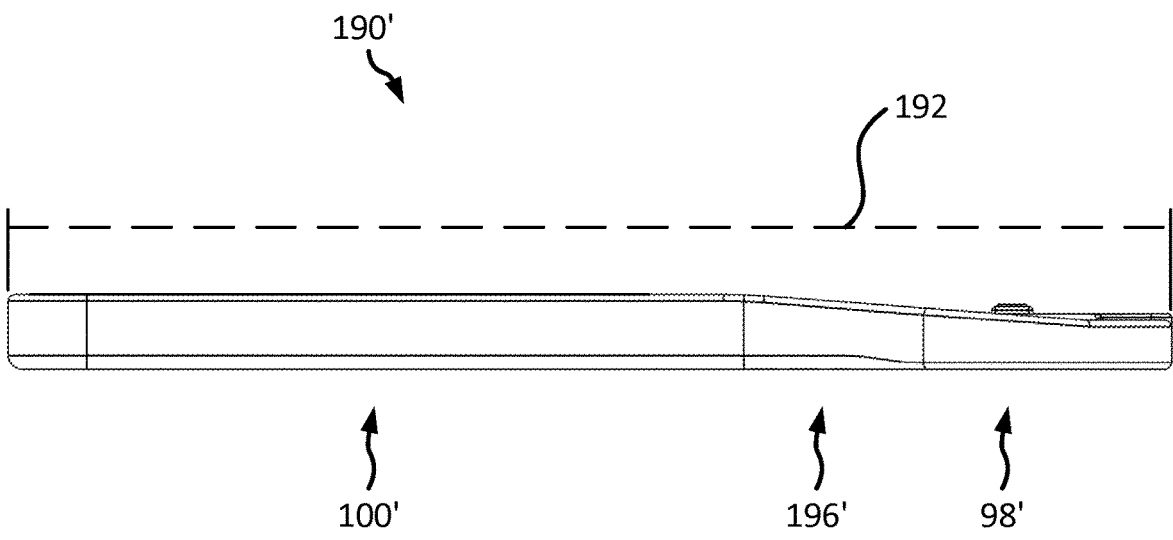
FIG. 15 is a side elevation view of the FIG. 14 handle.
Figure 16:
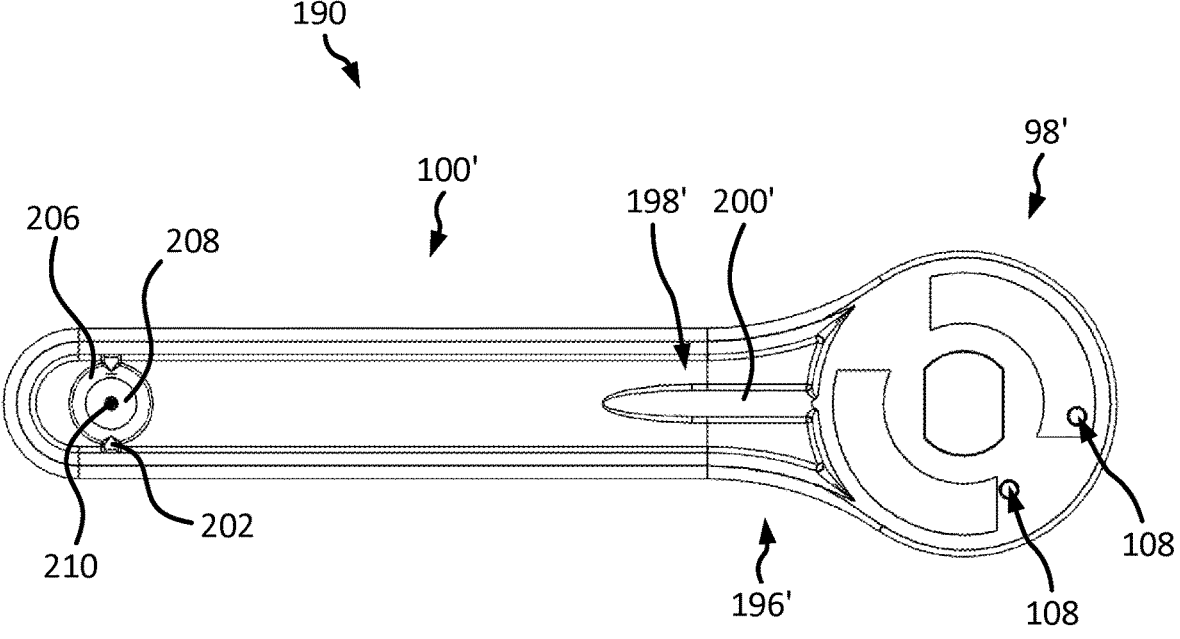
FIG. 16 is a bottom plan view of the FIG. 14 handle.

Referring to FIGS. 14, 15, and 16, handle 190' is an alternate version of handle 190 shown in FIGS. 11 through 13. As shown, handle 190' can have a generally flat shape. Base portion 98' and elongated portion 100' can extend the same vertical distance from valve body 70 when handle 190' is attached to valve body 70. Further, transition portion 196' can extend parallel to base portion 98' and elongated portion 100'. Conversely, in handle 190 in FIG. 14 and in handle 90 in FIG. 1, elongated portion 100 is generally elevated relative to base portion 98. As noted, using such a raised handle 190 can provide additional space for a user to grip handle 190. On the other hand, users may choose a flat handle 190' due to space constraints and/or personal preference as a few examples. In the illustrated example, elongated portion 100' generally extends parallel to base portion 98'. In another example, elongated portion 100' can extend at an angle relative to base portion 98' to allow a user to grip elongated portion 100' at an angle.

As shown in FIG. 16, handle 190' can include ribs 198' in a different arrangement than in handle 190. In the illustrated example, handle 190' includes a longitudinal rib 200' that extends along only a small portion of elongated portion 100' near base portion 98'. Further, handle 190' optionally includes very few or no lateral ribs 202. For instance, handle 190' can include only one lateral rib 202 that is intersected by guide 206. In some cases, the flat shape of handle 190' can be as structurally strong as raised handle 190 when using a smaller number and/or size of ribs 198'.

As should be recognized, handle 190 can include ribs 198 in any shape and/or arrangement. For example, handle 190 can include one, two, and/or another number of longitudinal ribs 200. In some versions, longitudinal ribs 200 can extend across all or most of elongated portion 100 and/or transition portion 196, such as from base portion 98 to guide 206. In other versions, longitudinal ribs 200 can extend along only a small section of elongated portion 100 and/or transition portion 196, such as just the area near base portion 98. The number and/or arrangement of lateral ribs 202 can vary based on length 192. For instance, handles 190 with a longer length 192 can have more lateral ribs 202 than shorter handles 190. In one version, lateral ribs 202 can be spaced in consistent intervals on elongated portion 100 along length 192. The shape of ribs 198 can vary on handle 190. In one example, longitudinal rib 200 and lateral ribs 202 can generally have the same shape. In another example, longitudinal rib 200 can extend further from elongated portion 100 than lateral ribs 198, particularly near base portion 98. Further, the number and/or size of ribs 198 can differ based on the raised or flat shape of handle 190. For example, a larger number and/or size of ribs 198 can be used on raised handle 190 to provide additional structural strength compared to flat handle 190'.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected.

The invention claimed is:

1. A valve assembly comprising:
a valve body, said valve body defining a body axis from a front side to a rear side, wherein said valve body includes a valve positioned within said valve body;
a handle rotatably attached to said valve body, said handle including a base portion attached to said valve body and an elongated portion extending away from said base portion, wherein said handle is rotatable about a handle axis relative to said valve body and between an open position and a closed position; and
an indicator positioned on an upper portion of said base portion of said handle, wherein said indicator is a color that is different than a color of said handle, wherein said indicator defines an arc that extends around said handle axis, wherein said indicator has a first end and a second end, and wherein said indicator defines a width in a direction transverse to said arc and that varies along said arc;
wherein rotating said handle to said open position opens said valve to allow fluid flow through said valve body, wherein said first end of said indicator is aligned with said body axis when said handle is in said open position;
wherein rotating said handle to said closed position closes said valve to obstruct fluid flow through said valve body, wherein said second end of said indicator is aligned with said body axis when said handle is in said closed position;
wherein said width of said indicator is greater at said first end than at said second end, wherein said width at said first end corresponds to said open position of said handle, wherein said width at said second end corresponds to said closed position of said handle, and wherein said width gauges the position of said handle between said open and closed positions as said width varies along said arc.

2. The valve assembly of claim 1, wherein said handle includes a tab that protrudes from said base portion, and wherein said tab is located at one of said first and second ends of said indicator.

3. The valve assembly of claim 1, wherein said indicator includes an inlay that is embedded in said base portion of said handle.

4. The valve assembly of claim 1, wherein said elongated portion extends along a first plane in a transverse direction to said handle axis, wherein said base portion extends along a second plane in a transverse direction to said handle axis and in a parallel direction to said first plane, wherein said handle defines a height between said first plane and said second plane, and wherein said second plane is spaced from said first plane by said height in a direction away from said valve body.

5. The valve assembly of claim 4, wherein said handle includes a transition portion positioned between said base portion and said elongated portion, wherein said transition portion is sloped relative to said base portion and to said elongated portion.

6. The valve assembly of claim 1, further comprising a marker positioned on said valve body, wherein the position of said indicator between said first end and said second end that is aligned with said marker corresponds to the position of said handle between said open position and said closed position.

7. The valve assembly of claim 1, wherein said handle includes a guide and a punch-out positioned on said elongated portion, and wherein said guide is configured to direct a tool to remove said punch-out from said handle.

8. The valve assembly of claim 1, wherein said handle is an orange color.

9. The valve assembly of claim 1, wherein said handle is a yellow color.

10. A valve assembly comprising:

a valve body, said valve body defining a body axis from a front side to a rear side, wherein said valve body includes a valve positioned within said valve body;

a handle rotatably attached to said valve body, said handle including a base portion attached to said valve body and an elongated portion extending away from said base portion, wherein said handle is rotatable about a handle axis relative to said valve body and between an open position and a closed position; and an indicator positioned on an upper portion of said base portion of said handle, wherein said indicator is a color that is different than a color of said handle, wherein said indicator defines an arc that extends around said handle axis, wherein said indicator has a first end and a second end, and wherein said indicator defines a width in a direction transverse to said arc and that varies along said arc;

wherein said base portion of said handle extends along a first plane oriented in a transverse direction to said handle axis, wherein said elongated portion of said handle extends along a second plane oriented in a transverse direction to said handle axis and in a parallel direction to said first plane, wherein said handle defines a height between said first plane and said second plane, and wherein said second plane is spaced from said first plane by said height in a direction away from said valve body;

wherein rotating said handle to said open position opens said valve to allow fluid flow through said valve body, wherein said first end of said indicator is aligned with said body axis when said handle is in said open position; and wherein rotating said handle to said closed position closes said valve to obstruct fluid flow through said valve body, wherein said second end of said indicator is aligned with said body axis when said handle is in said closed position.

11. The valve assembly of claim 10, wherein said handle is an orange color.

12. The valve assembly of claim 10, wherein said indicator is a green color.

13. The valve assembly of claim 10, wherein said handle includes a transition portion positioned between said base portion and said elongated portion, wherein said transition portion is sloped relative to said base portion and to said elongated portion.

14. The valve assembly of claim 10, wherein said handle includes a tab that protrudes from said base portion, and wherein said tab is located at one of said first and second ends of said indicator.

15. The valve assembly of claim 10, wherein said indicator includes an inlay that is embedded in said base portion of said handle.

16. The valve assembly of claim 10, further comprising a marker, wherein said marker is positioned on said valve assembly, and wherein said marker is aligned with said body axis.

17. A valve assembly comprising:

a valve body, said valve body defining a body axis extending through said valve body, wherein said valve body includes a valve positioned within said valve body;

a handle rotatably attached to said valve body, said handle including a base portion attached to said valve body and an elongated portion extending away from said base portion, wherein said handle is rotatable about a handle axis relative to said valve body and between an open position and a closed position, wherein said handle axis is oriented in a transverse direction to said body axis; and an indicator positioned on said base portion of said handle, wherein said indicator is a color that is different than a color of said handle, wherein said indicator defines an arc that extends around said handle axis, wherein said indicator has a first end and a second end, wherein said indicator defines a width in a direction transverse to said arc and that varies along said arc, and wherein said indicator denotes a range for said handle to rotate between said open position and said closed position;

wherein said valve body defines a first plane extending through said body axis and said handle axis;

wherein rotating said handle to said open position opens said valve to allow fluid flow through said valve body, wherein said first end of said indicator intersects said first plane when said handle is in said open position;

wherein rotating said handle to said closed position closes said valve to obstruct fluid flow through said valve body, wherein said second end of said indicator intersects said first plane when said handle is in said closed position; and wherein said width of said indicator is greater at said first end than at said second end, wherein said width at said first end corresponds to said open position of said handle, wherein said width at said second end corresponds to said closed position of said handle, and wherein said width gauges the position of said handle between said open and closed positions as said width varies along said arc.

18. The valve assembly of claim 17, wherein said elongated portion extends along a second plane in a transverse direction to said handle axis, wherein said base portion extends along a third plane in a transverse direction to said handle axis and in a parallel direction to said base portion, wherein said handle defines a height between said base portion and said elongated portion, and wherein said elongated portion is offset from said base portion by said height in a direction away from said valve body.

19. The valve assembly of claim 18, wherein said handle includes a transition portion positioned between said base portion and said elongated portion, wherein said transition portion is sloped relative to said base portion and to said elongated portion.

20. The valve assembly of claim 17, wherein said handle is an orange color and/or a yellow color, and wherein said indicator is a green color.

* * * * *